(No Model.)

J. P. FRIZELL.
STEP BEARING FOR VERTICAL SHAFTS.

No. 321,288. Patented June 30, 1885.

Witnesses:
William T. Oliver
A. Mackenzie

Inventor:
Joseph P. Frizell

United States Patent Office.

JOSEPH P. FRIZELL, OF BOSTON, MASSACHUSETTS.

STEP-BEARING FOR VERTICAL SHAFTS.

SPECIFICATION forming part of Letters Patent No. 321,288, dated June 30, 1885.

Application filed November 7, 1884. (No model.)

*To all whom it may concern:*

Be it known that I, JOSEPH P. FRIZELL, a citizen of the United States, residing at Boston, in the county of Suffolk and State of Massachusetts, have invented a new and useful Step-Bearing for Vertical Shafts, of which the following is a specification.

The object of my invention is to diminish the friction on the bearings of heavily-loaded vertical shafts and the loss of power and excessive wear consequent thereon. This object I attain by supporting the weight of the shaft and its loading, in whole or in part, by the upward pressure of liquids applied by the mechanism now to be described, reference being had to the accompanying drawings.

Figure 1:
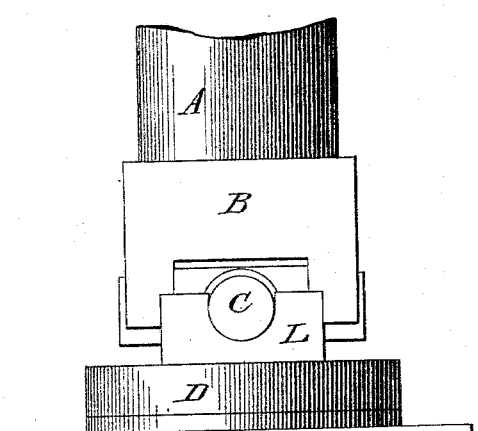
Figure 2:
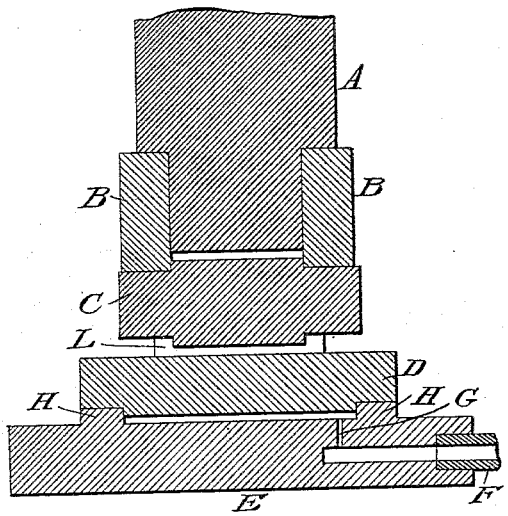
Figure 3:
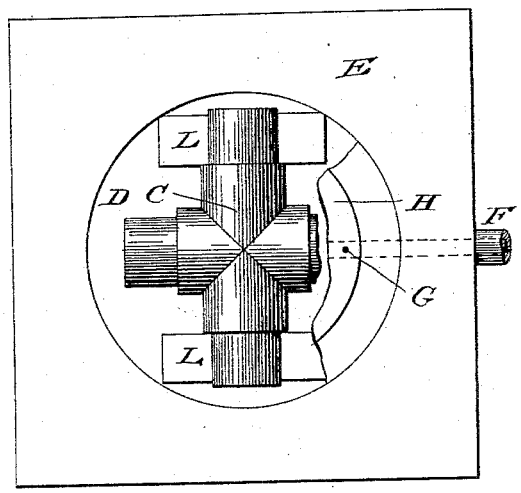

In the several figures, A represents the lower end of the vertical shaft. Figures 1 and 2 represent the usual arrangement of turbine water-wheel shafts, a square foot being formed on the lower end. Fig. 3 represents a plan view of the crossed pivot C. In the arrangement I propose this foot enters a socket, B, which is forked below, each branch of the fork being furnished with a hollow bearing, by which it rests on the journals of the crossed pivot C. The other two journals rest in bearings formed in the projections L L, cast on the cover D. This arrangement constitutes a gimbal intended to secure a perfectly uniform distribution of the weight on the cover D during the revolution of the shaft.

The cover D revolves with the shaft and rests on the fixed base-plate E. The friction takes place at the surfaces of contact of these two parts, which surfaces are represented in the sections, Fig. 2, by horizontal straight lines, indicating that they are plane surfaces perpendicular to the axis of the shaft. They may, however, be conical surfaces, in which case they would be represented in section by inclined straight lines; or they may be spherical surfaces, in which case they would be represented in section by arcs of a circle. The surfaces of contact are originally planed or turned so as to make as tight a joint as possible between D and E. It is believed that the mutual action of the parts will perfect and maintain this condition of tightness, as the surfaces are constantly undergoing the exact process that would be employed for making them tight if they were not so originally.

The chamber H, between the pieces D and E, is filled with liquid, and communicates by means of the orifice G and the pipe F with a reservoir of such liquid under the required pressure, or directly with the force-pump or other means employed for producing the pressure.

Two modes of operating the mechanism are contemplated. The liquid employed may be oil, in which case the upward pressure would be less than the weight on the bearing-surfaces by an amount sufficient to maintain tight contact and prevent waste of oil, insuring at the same time perfect lubrication. Water, also, may be used, in which case the pressure would be sufficient to relieve the bearing-surfaces of all weight, and neither lubrication nor prevention of waste would be necessary. A constant though very slow flow of water takes place through the pipe F and orifice G, escaping between the surfaces of contact, causing an infinitesimal and wholly imperceptible rise of the cover D. The minute orifice G has the effect to regulate and limit the volume of water wasted, since the escape between the bearing-surfaces of anything more than an exceedingly minute quantity of water would diminish the pressure in the chamber H, bring the bearing-surfaces into contact, and stop the escape of water entirely.

The arrangements for producing and maintaining pressure in the liquid form no part of the invention, and need not be described.

What I claim as my invention, and desire to secure by Letters Patent, is—

1. A step-bearing inclosing between the revolving part D and the fixed part E a chamber, H, filled with liquid under pressure, in combination with a device for centering or equalizing the pressure or load of the shaft on the bearing-surfaces, thereby causing these surfaces to maintain themselves by their mutual attrition in a condition to hold the liquid.

2. The crossed pivot C, with its bearings on the parts B and D, forming a gymbal for the centering or equalization of the pressure of the shaft on the bearing-surfaces, substantially as described, and for the purpose specified.

3. The circular form of the chamber H and the projection on the cover D, extending and fitting into the chamber H, thereby securing the shaft in a fixed alignment.

4. The minute orifice G, connecting the supply-pipe F with the chamber H, for the purpose set forth.

JOSEPH P. FRIZELL.

Witnesses:
JOHN M. B. CHURCHILL,
A. CHURCHILL.